United States Patent Office 3,506,448
Patented Apr. 14, 1970

3,506,448
BREAD IMPROVING COMPOSITION AND METHOD
Albert W. Kleinschmidt, Park Forest, and Sigurd T. Viren, La Grange Park, Ill., assignors to J. R. Short Milling Company, Chicago, Ill., a corporation of Illinois
No Drawing. Filed Sept. 27, 1967, Ser. No. 671,109
Int. Cl. A21d 2/00
U.S. Cl. 99—91                                   4 Claims

ABSTRACT OF THE DISCLOSURE

Bread improver compositions containing both an enzyme-peroxidizable fat and an active lipoxidase-containing material such as soy flour are improved by employing, as a carrier for the fat, a powdery material predominantly comprising sugars and proteins. Of such materials, dairy whey solids are superior. Inclusion of such powdery materials renders the compositions less oily and more free flowing despite high fat contents, allows quicker and better dispersion of the composition in aqueous media, and provides a greater improvement in body and flavor of bread made with the aid of the composition.

---

This invention relates to bread improvers, and to methods for producing bread, and is an improvement on the invention disclosed and claimed in copending application Ser. No. 465,777, filed June 21, 1965, by Albert W. Kleinschmidt, now abandoned.

As disclosed in U.S. Patent 3,108,878, issued Oct. 29, 1963, in the names of Kazuo Higashiuchi, Albert W. Kleinschmidt and Charles G. Ferrari, improvement in yeast-leavened baked goods can be achieved by introducing both an active lipoxidase material and a fat capable of being peroxidized in situ in at least a part of the water for the dough, by the action of lipoxidase during agitation in the presence of oxygen. The products resulting from such in situ enzyme peroxidation of the fat are uniquely capable of improving at least the flavor and body of the baked goods, particularly in continuous-mix baking. Copending application Ser. No. 465,777 discloses that the improvements are better attained if the lipoxidase and the fat are incorporated in a single particulate composition, with the fat distributed over the surfaces of the particles in the composition. In typical commercial applications of the invention described in said copending application, the particulate composition comprises enzymatically active soy flour, a particulate partially dextrinized corn endosperm flour as a carrier material, and an oil, such as soybean oil, capable of being peroxidized by the lipoxidase of the soy flour, the oil being present as a coating on the surfaces of at least the particles of the corn endosperm flour. Such compositions have proved highly advantageous because they allow the baker to handle only a single additive composition, rather than adding the fat and enzmye material separately, and because their use for some reason results in a more rapid formation of an emulsion of the fat in the aqueous liquid, with the emulsion being much more stable than when the fat and lipoxidase are added separately.

The compositions described in said copending application Ser. No. 465,777 are stable and free flowing, and have achieved wide commercial acceptance. However, bakery personnel employing such compositions, having long been in the habit of handling completely dry, usually powdery, ingredients and additives, still object to the single-package enzyme-fat composition of said application Ser. No. 465,777 as being "too oily." Additionally, with some compositions in some baking plants, an occasional tendency for such compositions to lump, rather than being fully dispersed, has been observed. The trade therefore prefers an additive composition having the capabilities described in said copending application Ser. No. 465,777, but in a form more like the completely dry ingredients with which the trade has long been familiar.

The present invention results from efforts to satisfy this demand, and is characterized not only by provision of single package compositions which are dry-to-powdery in nature but also by increased effectiveness. These results are achieved by substituting for part, or even all, of the corn flour or other carrier material at least one dry powdery material predominantly comprising sugars and proteins, such powdery material being selected from the class consisting of dairy whey solids, milk solids nonfat, whole milk solids, buttermilk powder, corn steep solids, and soybean whey solids. Such dry materials are very finely particulate, with an average particle size of not more than about 100 microns, and therefore present a very large surface area for supporting the enzyme-peroxidizable fat. Of equal importance, however, is the high solubility and dispersibility of the constituents of such materials in aqueous media.

Of the several suitable dry powdery materials just defined, dairy whey solids are markedly superior, not merely because of their acknowledged acceptability in baking formulas, but also because of their very high rate of solution and dispersion, and the fact that, when employed in accordance with the invention, their use results in a very prompt and stable emulsion of the enzyme-peroxidizable fat in the aqueous medium involved. It is thought that the speed of emulsification of the fat, and the unusually stable nature of the emulsion, results from the highly soluble and dispersible nature of the whey solids. Further, possibly because of the superior nature of the emulsion obtained, use of the dairy whey solids results in a quicker, and apparently more extensive, enzyme peroxidation of the fat with the result that, for a given time of agitation and a given proportion of the additive composition, a more marked improvement in body and flavor of the baked goods is attained than has heretofore been possible.

Incorporation of the dry powdery materials hereinbefore defined does not affect the choice of enzyme materials, enzyme-peroxidizable fats, and carrier materials which can be employed to make up the single-package composition. Thus, the enzyme material can be lipoxidase in any edible form, suitable for introduction into an aqueous system. For practical purposes, particulate legume materials are the best enzymatic materials for use in accordance with the invention. Thus, enzymatically active soybean flour, soybean meal and soybean flakes are all excellent lipoxidase-containing materials for use in the invention. Equivalent materials derived from peas, peanuts, lima beans, navy beans and lentils are suitable. When a naturally oil-rich material such as soybean flour is employed, it can be either full fat, low-fat or fat-free, so long as it exhibits adequate lipoxidase activity. Mixtures of two or more lipoxidase source materials can be employed.

The fats useful in accordance with the invention are those which can be peroxidized by enzymes. Thus, there can be employed any unsaturated edible fat containing linoleic, linolenic, or archadonic acid, alone or in combination. Edible oils of vegetable origin are suitable, including soybean oil, cottonseed oil, corn oil, peanut oil, safflower oil, poppy-seed oil, sunflower oil, wheat germ oil, sesame oil, and oiticica oil and margarines made therefrom. Peroxidizable animal fats can also be used, including soft lards, margarines containing animal fats, oils extracted from animal skins, and refined marine oils. Various combinations of solid fats and oils, formulated for proper fluidity, can be employed, a mixture of lard with 10–50% by weight cottonseed oil being typical. In general, higher quality, more refined fats yield superior results.

Though the dairy whey solids or other predominantly sugar-and-protein containing powdery material can be employed as the sole carrier for the fat, or as the sole carrier other than the enzymatic material, it has been found that, for some reason, superior results in terms of body and flavor of the baked goods are obtained when the dairy whey solids or like material constitutes only a portion of the total carrier material employed. The balance of the total proportion of carrier can be made up by any finely particulate edible material which is essentially insoluble in the fat and is inert with respect to both the fat and the enzymatically active material. Partially gelatinized or partially dextrinized corn endosperm flour is particularly suitable, as is also wheat farina. Any of the cereal flours, such as those from wheat, corn, milo maize and sorghum, can be used. Noncereal flours, such as potato flour and tapico flour, are also suitable. Soybean materials, such as flakes, from which the oil has been extracted can be used. The starches, including particularly wheat starch and corn starch, can be used. Various particulate solid protein materials are suitable, including powdered gelatin, soybean protein, and wheat gluten. Suitable inorganic materials can also be used, such as calcium carbonate, tricalcium phosphate and calcium sulfate. The carrier material must be finely particulate. Materials having an average particle size of 50–175 microns are suitable, and an average particle size in the range of 75–150 microns is particularly advantageous. Rather than a single extender material, a combination of two or more different extender materials can be employed.

Compositions according to the invention can comprise 5–92% by weight enzymatically active material, 3–30% by weight, fat 5–50% by weight dairy whey solids (or other predominantly sugar-protein powdery material) and 0–87% by weight carrier material (e.g., corn endosperm flour) other than the whey solids. Where a legume flour is employed as the lipoxidase source and contains part or all of its native fat content (e.g., full fat soybean flour, containing 18–20% by weight native soybean oil), the native fat content is included in the total proportion of enzyme-peroxidizable fat for the composition.

Within the broad operable ranges of proportions given above, superior results are attained when the enzymatically active material constitutes 20–30% by weight, the enzyme peroxidizable fat 10–20% by weight, and the dairy whey solids or like material 5–15% by weight, the other carrier material, such as corn endosperm flour, making up the balance of the composition.

The compositions can be prepared by any conventional blending procedures, with the fat being distributed primarily on the carrier material or materials or both on the carrier and the enzymatically active materials. The compositions can be packed, shipped and stored in conventional bags and remain stable, exhibiting no undue loss in enzyme activity, over storage periods as long as 6 months at room temperature.

Compositions according to the invention can be employed in both continuous-mix baking procedures and batch procedures, resulting in improvements in at least the body and flavor of the baker products. In the continuous-mix methods, the composition is best added to all or part of the water for the brew, and the water then agitated until the composition is well dispersed. Agitation is required both to accomplish adequate dispersions of the additive composition and to provide good contact between the lipoxidase, fat and oxygen to accomplish peroxidation of the fat, the oxygen being present because of the air introduced during agitation. However, for reasons not fully understood, shorter periods of agitation are effective to accomplish enzyme-peroxidation of the fat with the compositions of this invention than when prior-art practices are followed, and good results have been achieved with as little as 1 min. of vigorous agitation. The time required of course depends upon the effectiveness of the agitation and, if only mild agitation is employed, the time period can be extended, the upper limit being about 6 hours. In batch dough making procedures, the additive composition is simply dispersed in all or a portion of the water to be used in making the dough.

To assure proper in situ peroxidation of the fat, the temperature of the aqueous medium in which the composition is dispersed is maintained in the range of 40–110° F., and the pH is kept in the range of 4.0–8.5.

The additive composition is employed in an amount capable of introducing into the aqueous liquid a quantity of total fat, including both the fat disposed on the particulate materials and any native fat supplied by the enzyme source material, equal to 0.025–0.600% of the total weight of flour to be employed in the dough. From the standpoint of practicality, economy and optimum results, the total quantity of enzyme-peroxidizable fat introduced into the dough is kept in the range of 0.040–0.350% of the flour weight.

The following example illustrates the manner in which additive compositions according to the invention can be prepared:

EXAMPLE 1

Thirty parts by weight of full fat, enzymatically active soybean flour, 45 parts by weight of partially dextrinized corn endosperm flour, and 10 parts by weight of "extra grade" commercially available dairy whey solids are charged to a conventional conical blender equipped with an intensifier bar for the introduction of liquids, the blender being in the nature of a tumbling mixer and manufactured by Patterson-Kelley Co., East Stroudsburg, Pa. The blender is then operated for 5 mins. to assure uniform mixing of the three dry ingredients. Ten parts by weight of soybean oil and 5 parts by weight of safflower oil are then introduced, via ducts and ports in the intensifier bar, over a period of 10 mins. with continual mixing, and the composition is then mixed for an additional 10 mins. The finished composition, hereinafter identified as Composition A, is dry, lump-free and free-flowing, despite its high fat content. With the composition prepared in this fashion, the oil is distributed over the surfaces of the particles of all three of the particulate constituents.

The same procedure can be employed in preparing the following additional compositions:

| Composition | Parts by weight | | | | |
| --- | --- | --- | --- | --- | --- |
| | Full fat, enzyme active soy flour | Dairy whey solids | Soy oil | Corn endosperm flour | Safflower oil |
| B | 30 | 20 | 10 | 35 | 5 |
| C | 30 | 30 | 10 | 25 | 5 |
| D | 42.5 | 42.5 | 10 | | 5 |
| E | 40 | 40 | 13.33 | | 6.67 |
| F | 30 | 48 | 10 | 7 | 5 |
| G | 5 | 5 | 3 | 87 | |
| H | 30 | | 10 | 55 | 5 |

In all of the compositions described in this example, the corn endosperm flour is a partially dextrinsized product having an average particle size of 50–175 microns, and the enzymatically active soy flour has an average particle size in the range of 50–100 microns and a native fat content of approximately 19% by weight.

Composition H can be considered as a control composition, containing no dairy whey solids. All of Compositions A–G are distinctly less oily and more free flowing than composition H. Compositions A, B and C are progressively drier, due to the increasing whey solids content, with Composition C being completely powdery. All of Compositions A–G disperse in water more promptly, with less agitation required, than in the case of Composition H.

The following example illustrates the method embodiment of the invention:

EXAMPLE 2

The bread improving effects of Compositions A and H were compared under continuous-mix conditions, using a pilot plant continuous-mix unit known to the trade as a Do-Maker unit, manufactured by Wallace & Tiernan, Inc., Belleville, N.J., generally in accordance with U.S. Patent 2,953,460, issued Sept. 20, 1960, to John C. Baker, save that the preliminary dough mix was prepared in batch and pressure-fed to the developer by a piston-and-cylinder device. The formula employed was as follows:

Brew formula

| Ingredient: | Percent of flour weight |
| --- | --- |
| Water | 62.0 |
| Sugar | 8.0 |
| Milk solids nonfat | 2.0 |
| Yeast | 2.5 |
| Salt | 2.3 |
| Nonphosphate yeast food | 0.5 |
| Calcium acid phosphate | 0.2 |
| Calcium propionate | 0.1 |

Dough formula

| Ingredient: | Percent of flour weight |
| --- | --- |
| Bleached white bread wheat flour | 100.0 |
| Additional water | 4.0 |
| Shortening | 3.25 |

An aqueous solution of potassium bromate and potassium iodate was employed to provide 50 p.p.m. of potassium bromate, based on the total flour, and 12.5 p.p.m. of potassium iodate. The brew was fermented at 86° F. for 2.25 hours. A baking time of 18 min. at 435° F. was employed.

One dough was prepared with the addition of 1%, based on the total flour weight, of Composition H. Another dough was prepared with 1% of Composition A. In each case, 1 gal. of the water for the brew was placed in an open top container and stirred with a propeller agitator operated at 1720 r.p.m., all of the additive composition (Composition H for one dough, Composition A for the other) being added during such agitation, and agitation then being continued at 1720 r.p.m. for 10 mins. to accomplish dispersion and enzyme peroxidation of the fat content of the additive composition. The entire aqueous composition was then employed in preparing the brew. The bread obtained was scored comparatively 1 day after baking, and the bread from the dough prepared with Composition A proved to be observably better, as to both body and flavor, than the bread from the dough prepared with Composition H.

EXAMPLE 3

The procedure of Example 2 was followed, again preparing one dough with Composition A and another with Composition H, but with the agitation of the additive composition in the 1 gal. quantity of water being limited to 65 sec., again with the propeller agitator driven at 2500 r.p.m. The improvement in body and flavor of the bread, though somewhat less marked than in Example 2, was again found to be distinctly greater for the bread prepared with Composition A than for that prepared with Composition H.

Since Composition A, containing 10% by weight dairy whey solids, gives results distinctly superior to those obtained with control Composition H, containing no whey solids, it might be assumed that the improvement obtained in body and flavor of the bread would vary more or less directly with the amount of whey solids substituted for the corn flour or like carrier material. However, comparisons of additive compositions containing varying proportions of whey solids show that the improvement increases with increasing proportions of whey solids only to a point where approximately 10% by weight of whey solids is employed, further increasing the amount of whey solids resulting in a decrease in the improvement obtained in body and flavor of the bread. The following example is illustrative:

EXAMPLE 4

The procedure of Example 2 was repeated, save that three doughs were prepared, one employing Composition H, without whey solids, another employing Composition A, and a third using Composition E, containing whey solids as the only carrier material other than soy flour. Both Compositions A and E dispersed more readily than Composition H. The bread baked from the dough containing Composition A was observed to have a stronger flavor and better body than both the bread from the dough containing Composition H and the bread from the dough containing Composition E, though the latter bread scored higher in body and flavor than did the control.

Compositions similar to Compositions A–G but containing other powdery sugar- and protein-containing carrier materials (e.g., buttermilk powder) in place of all or part of the dairy whey solids can be prepared by the method set out in Example 1 and exhibit, in general, body- and flavor-improving properties as described in Examples 2–4.

What is claimed is:

1. A bread improver composition in the form of a dry, particulate, free-flowing composition comprising a uniform blend of:
   5–92% by weight of a particulate, active lipoxidase-containing material;
   3–30% by weight of an enzyme-peroxidizable fat;
   5–50% by weight of a powdery solid material which predominantly comprises sugars and proteins and is selected from the group consisting of dairy whey solids, milk solids nonfat, whole dry milk, buttermilk powder, corn steep solids, and soybean whey solids; and
   0–87% by weight of a particulate compatible carrier material other than said powdery solid material, said fat being distributed on and supported by the particles of at least said powdery solid material.

2. A bread improver composition according to claim 1, wherein:
   said powdery solid material is dairy whey solids.

3. A bread improver composition according to claim 1, wherein:
   said powdery solid material amounts to 5–15% by weight.

4. In the method of improving the body and flavor of yeast-leavened baked goods by dispersing an active lipoxidase-containing material and an edible enzyme-peroxidizable fat in at least a portion of the water for the dough formula and accomplishing in situ peroxidization of the fat by mixing, the improvement comprising:
   introducing at least a major portion of the fat in the form of coatings on the particles of a powdery solid material selected from the group consisting of dairy whey solids, milk solids nonfat, whole dry milk, buttermilk powder, corn steep solids, and soybean whey solids.

References Cited

UNITED STATES PATENTS 2,978,332 4/1961 Ferrari _____ 99—91
3,108,878 10/1963 Higashiuchi et al. _____ 99—90

FOREIGN PATENTS 897,381 5/1962 Great Britain.

LIONEL M. SHAPIRO, Primary Examiner